3,422,623
JET ENGINES WITH COOLING MEANS
John Alexander Henderson Scott, Mickleover, Derby,
England, assignor to Rolls-Royce Limited, Derby,
Derbyshire, England, a British company
Filed Jan. 19, 1967, Ser. No. 610,396
Claims priority, application Great Britain, Feb. 3, 1966,
4,879/66
U.S. Cl. 60—226     4 Claims
Int. Cl. F02k *3/02, 11/00;* F01d *25/12*

ABSTRACT OF THE DISCLOSURE

A jet engine, e.g. for use in a tank, or other land vehicle, in which part of the air compressed by the compressor passes through a conduit which is in heat exchange with the combustion equipment and jet pipe, and whose outlet is adjacent the engine outlet nozzle, the engine exhaust gases helping to cause compressed air to be drawn through the conduit.

---

This invention concerns improvements relating to jet engines.

According to the present invention, there is provided a jet engine having conduit means which are adapted to receive cooling fluid and are disposed in heat exchange relationship with a heated portion of the engine, the conduit means having outlet means through which the cooling fluid may escape to atmosphere, the outlet means being disposed adjacent the outlet nozzle of the engine so that the exhaust gases of the engine cause, or assist in causing, cooling fluid to be drawn through the conduit means.

It will be appreciated that, although the present invention is of wide application, it is particularly useful in cases where the jet engine is located in an engine compartment of a land vehicle such for example as a tank, since adequate cooling of the engine may be difficult in such locations.

The jet engine preferably has a compressor part whose compressed air is supplied to the said conduit means to constitute the said cooling fluid.

The conduit means may have a plurality of tortuous flow paths therethrough.

The said heated portion of the engine may comprise the combustion equipment thereof, and/or a jet pipe thereof.

The invention also comprises a land vehicle having an engine compartment in which is mounted at least one jet engine as set forth above.

Figure 1:
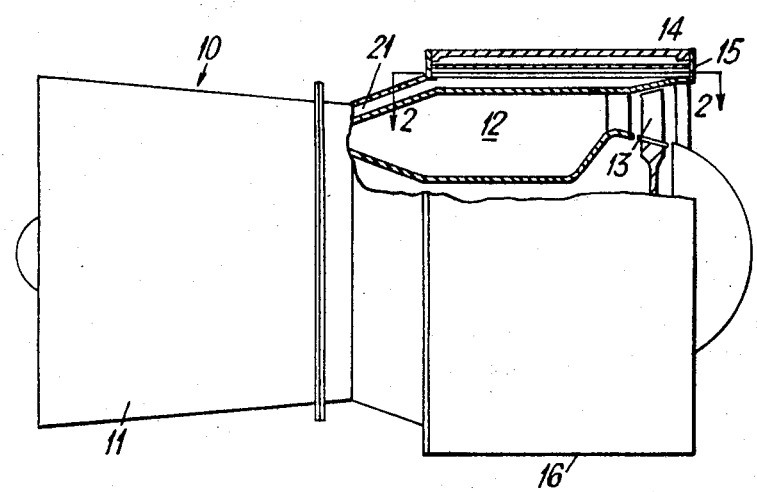
Figure 2:
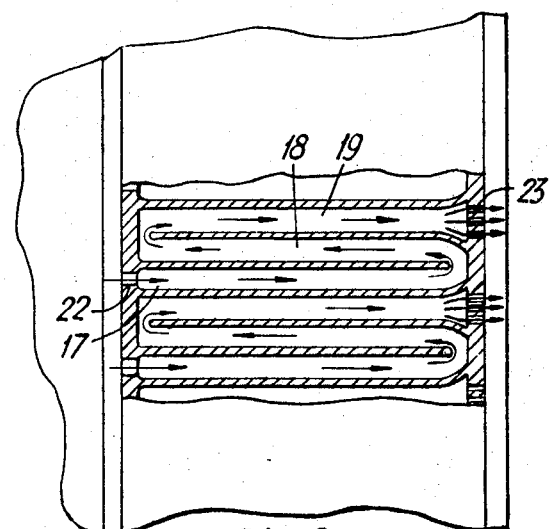

The invention is illustrated, merely by way of example, in the accompanying drawings, in which:

FIGURE 1 is a diagrammatic view, partly in section, of a jet engine according to the present invention, and FIGURE 2 is a broken-away section view on a larger scale taken on the line 2—2 of FIGURE 1.

Referring to the drawings, a gas turbine jet engine 10 is provided in flow series with a compressor 11, combustion equipment 12, a turbine 13 which drives the compressor 11, and a short jet pipe 14 leading to an outlet nozzle 15.

The downstream portion of the engine 10 is surrounded by a casing 16, the casing 16 surrounding the jet pipe 14, turbine 13, and the greater part of the combustion equipment 12.

Within the casing 16 there are provided a plurality of tortuous flow paths each of which has a downstream extending portion 17 leading to an upstream extending portion 18, the latter leading to a downstream ending portion 19, the portions 17–19 being parallel to each other.

Cooling air for passage through the flow paths 17–19 is supplied from a duct 21 from which the cooling air passes into the portions 17 through apertures 22, part of the air compressed by the compressor 11 being supplied to the duct 21.

The cooling air flowing through the flow path 17–19 is heat exchange relationship with the combustion equipment 12, turbine 13 and jet pipe 14. The cooling air escapes to atmosphere from the portions 19 through outlet apertures 23, the apertures 23 being disposed adjacent the outlet nozzle 15 so that the exhaust gases of the engine assist in causing the cooling air to be drawn through the flow paths 17–19.

I claim:
1. A jet engine comprising: compressor means, combustion equipment, and turbine means in flow series; a jet pipe; and an outlet nozzle for exhaust gases; conduit means for a cooling gas disposed in heat exchange relationship with a heated portion of the engine, said conduit means having a plurality of tortuous flow paths, each of said tortuous flow paths being completely in heat exchange relationship with the heated portion of the engine and each of said tortuous flow paths having at least a part of the same directing the cooling gas in a substantially opposite direction to the working fluid of the jet engine; cooling gas supply means for said conduit means; and outlet means communicating with said conduit means for discharging cooling gas therefrom to atmosphere, said outlet means being disposed adjacent to said outlet nozzle whereby discharge of engine exhaust gases assists in causing cooling gas to be drawn through said conduit means from said cooling gas supply means.

2. A jet engine as claimed in claim 1 in which said cooling gas supply means receives a portion of compressed air from said compressor means.

3. A jet engine as claimed in claim 1 in which the said heated portion of the engine comprises the combustion equipment thereof.

4. A jet engine as claimed in claim 1 in which the said heated portion of the engine comprises the engine jet pipe.

References Cited
UNITED STATES PATENTS

| | | | |
|---|---|---|---|
| 2,397,998 | 4/1946 | Goddard | 60—39.66 XR |
| 2,591,676 | 4/1952 | Clayton | 60—39.66 XR |
| 2,625,793 | 1/1953 | Mierley et al. | 60—39.66 XR |
| 2,639,579 | 5/1953 | Willgoos | 60—266 |
| 2,652,216 | 9/1953 | Hoffman | 60—39.66 XR |
| 2,853,854 | 9/1958 | Avery et al. | 60—39.66 |
| 2,868,500 | 1/1959 | Boulet | 60—39.66 XR |
| 3,024,606 | 3/1962 | Adams et al. | 60—267 XR |
| 3,269,119 | 8/1966 | Price | 60—39.66 XR |

JULIUS E. WEST, *Primary Examiner.*

U.S. Cl. X.R.

60—39.66, 266; 253—39.1